US009160993B1

(12) United States Patent
Lish et al.

(10) Patent No.: US 9,160,993 B1
(45) Date of Patent: Oct. 13, 2015

(54) USING PROJECTION FOR VISUAL RECOGNITION

(71) Applicant: Amazon Technologies, Inc., Reno, NV (US)

(72) Inventors: Christopher John Lish, Seattle, CA (US); Geoffrey Scott Heller, Seattle, WA (US); Jim Oommen Thomas, Seattle, WA (US); Chang Yuan, Seattle, WA (US); Oleg Rybakov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 165 days.

(21) Appl. No.: 13/945,823

(22) Filed: Jul. 18, 2013

(51) Int. Cl.
G03B 21/14 (2006.01)
H04N 9/31 (2006.01)
H04N 5/232 (2006.01)

(52) U.S. Cl.
CPC ......... *H04N 9/3185* (2013.01); *H04N 5/23229* (2013.01); *H04N 9/3194* (2013.01)

(58) Field of Classification Search
CPC . H04N 9/3185; H04N 9/3194; H04N 9/3197; G03B 21/00; G03B 21/14
USPC ............ 353/28, 30, 69, 70, 94, 122; 345/581, 345/589; 348/14.01, 143, 207.1, 743–747, 348/E5.024, E7.078, E7.085; 715/209, 230, 715/716, 740, 753, 764, 781, 863, 864
See application file for complete search history.

(56) References Cited

U.S. PATENT DOCUMENTS

| 8,508,710 | B2 * | 8/2013 | Huddleston et al. | 352/106 |
| 2008/0036976 | A1 * | 2/2008 | Han | 353/69 |
| 2008/0068566 | A1 * | 3/2008 | Denoue et al. | 353/122 |
| 2008/0279453 | A1 * | 11/2008 | Candelore | 382/176 |
| 2009/0091710 | A1 * | 4/2009 | Huebner | 353/28 |
| 2011/0154233 | A1 * | 6/2011 | Lamarca et al. | 715/764 |
| 2012/0256824 | A1 * | 10/2012 | Mizunuma et al. | 345/156 |

* cited by examiner

*Primary Examiner* — Sultan Chowdhury
(74) *Attorney, Agent, or Firm* — Novak Druce Connolly Bove + Quigg LLP

(57) ABSTRACT

Approaches enable the projection of one or more visual elements, such as one or more dynamically changing graphical elements, that can substantially bound, or otherwise at least partially surround or identify, an object recognized by a computing device. The computing device can project the graphical elements to collectively appear as a bounding element for the recognized/actionable object or object portion. As such, the graphical elements can appear as a bounding element that adorns, decorates, highlights, and/or emphasizes, etc., the recognized/actionable object or object portion. The graphical elements to be dynamic. For example, the graphical elements can be projected to move around individually over time, while still appearing to at least partially surround the recognized/actionable object or object portion. Further, the graphical elements can be used to improve various object recognition approaches.

20 Claims, 10 Drawing Sheets

USING PROJECTION FOR VISUAL RECOGNITION

BACKGROUND

People are increasingly interacting with computers and other electronic devices in new and interesting ways. For example, visual recognition and augmented reality systems have become more ubiquitous on mobile devices. A user can use their device to recognize and obtain information about objects in the field of view of a camera on the device, such as bar codes, product covers, text, among other objects. In doing so, the user will generally attempt to center the object in the field of view of the camera. The user may additionally attempt to account for lighting and other factors to improve accuracy of the visual recognition. After the object is recognized, a graphical overlay can be rendered on a display element of the device so that the user can see virtual information augmenting the on-screen imagery. Conventional approaches, however, inherently block the user's view of the object. Further, in many situations, there is visible lag in the process (i.e., capturing an image, visual recognition, and graphics rendering). Further still, the process is generally a single-user experience on a small screen, where multiple users have to squeeze in around the device to view the device's screen.

OF THE DRAWINGS

Various embodiments in accordance with the present disclosure will be described with reference to the drawings, in which:

FIGS. 1(a) and 1(b) illustrates an example environment in which various aspects can be implemented in accordance with various embodiments;

FIG. 2 illustrates an example situation in which one or more graphical features can be utilized as visual feedback to the user in accordance with various embodiments;

FIGS. 3(a), 3(b), 3(c), 3(d), and 3(e) illustrate example situations of using projected graphical features for at least object recognition purposes in accordance with an alternate embodiment;

FIGS. 4(a), 4(b), and 4(c) illustrate examples of projecting graphical features based at least in part on an object in a field of view of a camera in accordance with various embodiments;

DETAILED DESCRIPTION

Figure 1A:
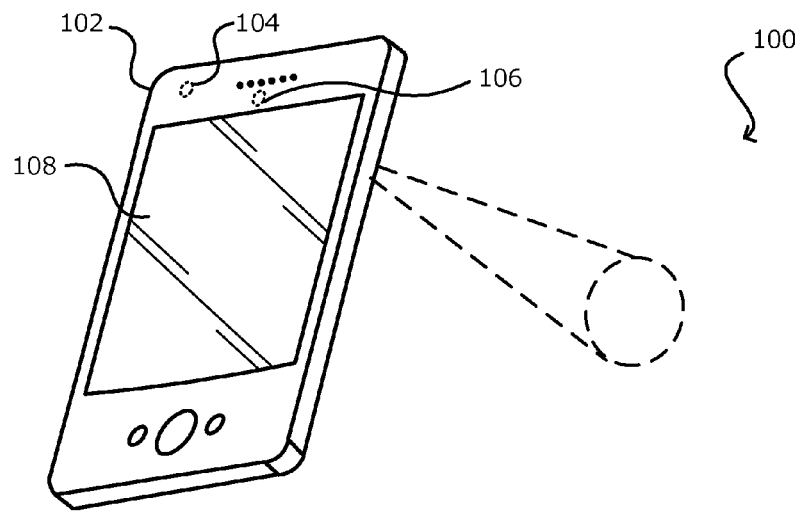

Systems and methods in accordance with various embodiments of the present disclosure may overcome one or more of the aforementioned and other deficiencies experienced in conventional approaches to communicating information using an electronic device. In particular, various embodiments of the present disclosure enable the projection of one or more visual elements, such as one or more dynamically changing graphical elements, that can substantially bound, or otherwise at least partially surround or identify, an object recognized by the computing device. For example, a camera of a computing device (e.g., a mobile phone, a tablet computer, a wearable computer, etc.) can be caused to capture one or more images of an object and a representation of the object in the image(s) can be identified using an appropriate object recognition process. In accordance with various embodiments, the device can include, or be in communication with (e.g., by wire or wirelessly), at least one projecting element that can be configured to project light, images, or various graphical elements (e.g., shapes, text, etc.) on a surface of, or near, the object. The projection can be used to highlight at least one object, guide the user in capturing images of at least one object, improve conditions (e.g., lighting) to provide for capturing images of better quality. Further, projecting on or near the surface essentially extends the display for the device, allowing for various applications and uses. Further still, in accordance with various embodiments, the projected graphical element(s) can be used in various visual recognition and augmented reality approaches. Further still, the ability of the user of the device to hold, place, and/or use the device at a convenient angle can reduce the fatigue caused by holding the device in a particular manner to capture and/or display information.

At least some embodiments enable the computing device to capture one or more images, such as image frames for a live video feed. The one or more images can be analyzed to determine one or more recognizable objects included within the images, such as text, characters, symbols, logos, books, albums, products, landmarks, faces, etc. In some embodiments, the one or more objects can be recognized using, at least in part, an object recognition process. For example, the object recognition process can recognize text using an optical character recognition (OCR) technique. In another example, the object recognition process can recognize a human face using a facial recognition technique. As used herein, an object may refer to a physical object (such as a sign) or any portion or aspect of the physical object such as text displayed on the sign.

In some embodiments, at least one actionable object or object portion of an object can be determined from the one or more recognized objects. For example, an actionable item can be text representing a phone number that the computing device can dial, a URL that the computing device can navigate to using a browsing application, an email address that the computing device can communicate with using a mail application, and so forth. In some embodiments, the actionable item can be determined based at least in part on a search query. For example, the user can speak or type into a search field of the device one or more search terms and one or more graphical elements can be projected from the computing device to substantially bound, surround, or otherwise identify the recognized and/or actionable objects (or object portions) based at least in part on the search terms.

In various embodiments, the computing device can project the graphical elements onto a surface of the object to collectively appear as a bounding element for a recognized/actionable object or object portion of the object. In other embodiments, the graphical elements can be displayed on a display of the device, along with additionally information associated with the object. In any situation, the projected graphical elements and/or the graphical elements displayed on the display element can appear to form a bounding element that adorns, decorates, highlights, and/or emphasizes, etc., the recognized/actionable object or object portion. In some embodiments, bounding element can comprise one or more non-contiguous pieces. In some embodiments, graphical element can comprise one or more non-contiguous pieces.

Further, various embodiments of the present disclosure enable the graphical elements to be dynamic. For example, if the display position of the recognized/actionable object or object portion changes, then the projected positions of the graphical elements can change correspondingly in order to maintain the appearance of the bounding element substantially surrounding the object or object portion. In another example, the computing device can project the graphical elements such that the graphical elements move around individually on at least a portion of the surface of the object, while still appearing to overlay and substantially bound the recognized/actionable object or object portion of the object. Thus, the graphical elements can resemble artificial fireflies or other organisms that fly or move in an enclosed path on the surface of the recognized/actionable object or object portion of the object. In a further example, a color and/or brightness property of the graphical element can be modified. As such, a color and/or glow emanating from the graphical elements can cause the recognized/actionable object or object portion of the object to have a similar color and/or glow. Accordingly, the graphical elements can provide an animated, interactive, and interesting approach to providing information using the computing device. Various other applications, processes, and uses are presented below with respect to the various embodiments.

FIG. 1 illustrates an example environment 100 in which aspects of the various embodiments can be utilized. The example environment can comprise a computing device 102, which can include at least one camera 104 operable to perform functions such as image and/or video capture, a projection element 106 operable to project light, images, or various graphical elements (e.g., shapes, text, etc.), and a display (e.g., display screen) 108. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, wearable computers (e.g., smart watches, smart glasses, etc.), and portable media players, among others.

A user of the device can use the at least one camera to capture one or more images of the environment. In some embodiments, the one or more images can correspond to one or more video image frames. In one example, the images can be associated with a live video feed of at least a portion of the environment captured by the camera. In some embodiments, the one or more images can be presented on the display of the computing device. For example, the user can initiate a particular mode of operation of the device and the device can begin capturing a live video feed of the example environment, which can be displayed on the display of the computing device.

The projector element can be used to illuminate an object being imaged (e.g., by providing light) and/or can project one or more graphical element(s) that can be used in various visual recognition and augmented reality techniques. For example, as shown in example 120 of FIG. 1(b), a user 110 can initiate a particular mode of operation on the device 102 which enables the device to capture one or more images corresponding to a live video feed of what the camera can "see" (i.e., of what is within the view of the lens of the camera). Upon initiating the mode, the projecting element of the device can project one or more graphical elements, such as a bounding shape 128. The bounding shape can include any shape, such as a rectangle, square, circle, quadrangle, and can be of any color. The size of the bounding shape can correspond to the camera's field of view. In various other embodiments, the size of the bounding shape can correspond to an optimal area to center the object for object recognition purposes. The projecting element can project the bounding shape on the surface of the object or an area around the object and the user can moving the device to center the object in the bounding shape. In this way, the bounding shape can visual indicate to the user the effective area in which the device will perform object recognition.

Figure 1B:
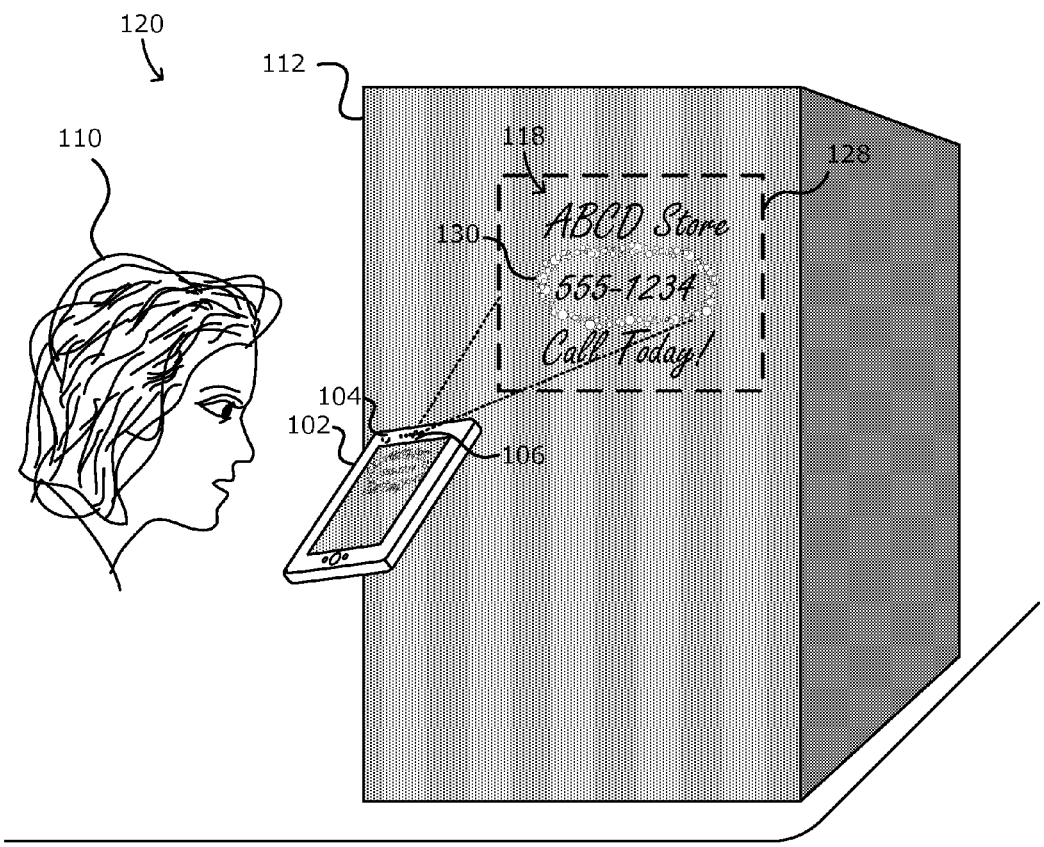

Continuing with this example, the user can capture one or more images of a sign 118 on a building 112. As shown in FIG. 1(b), the sign can be positioned within the bounding shape, and can include, for example, text that reads "ABCD Store 555-1234 Call Today!". The computing device can analyze the captured images or live video feed within the bounding shape in order to recognize (i.e., identify, determine, etc.) one or more objects included in the bounding shape. The objects can include, but are not limited to, text, characters, symbols, logos, books, albums, products, landmarks, faces, etc. In some embodiments, an object recognition process (or algorithm) can be utilized, at least in part, to recognize the one or more objects. The object recognition process can use image processing (e.g., edge detection, pixel comparison, etc.) and/or other techniques or approaches in attempt to recognize the objects. In some cases, the object recognition process can be performed on the computing device. In some cases, the device can transmit the captured images to one or more devices (e.g., servers) external to the computing device, where the images are then analyzed using the object recognition process. The device(s) external to computing device (i.e., external device(s), external server(s), etc.) can then transmit information about recognized objects back to the computing device. In some embodiments, the information can include (but not limited to) an identity of an object, a location of an object, a price of an object, etc. In some embodiments, data about recognized objects can be obtained to indicate where at least some of the edges of the recognized objects are.

In this example, the captured images can include text that reads "ABCD Store 555-1234 Call Today!" The images can be analyzed to recognize the text. For example, an optical character recognition (OCR) process or algorithm can be utilized to recognize the text "ABCD Store 555-1234 Call Today!" Within this recognized text, it can be determined that "555-1234" is an actionable item. This can be because the device can dial "555-1234" as a phone number. As such, it can be beneficial to highlight or otherwise emphasize the text portion "555-1234" to a user of the device. In some instances, the OCR process can correspond to, or be included as a part of, the object recognition process.

In some embodiments, the device and/or the external server(s) can determine at least a portion of a recognized object that is actionable. In other words, the device and/or the external server(s) can determine a portion(s) or the entirety of the recognized object on which an action can be performed. Continuing with the example, the computing device and/or the external server(s) can determine, from the recognized text ("ABCD Store 555-1234 Call Today!"), that "555-1234" can be an actionable portion/item. In this example, "555-1234" can be actionable because "555-1234" can correspond to a phone number which the device can call. Other examples of actionable items can include (but is not limited to) an email address, a URL, a machine-readable code (e.g., QR code), an address, a human face, a logo, a product, etc.

In accordance with various embodiments, the projector element 106 can project one or more graphical elements 130 that substantially bound or at least partially surround (i.e., bound or surround within an allowable deviation with respect to) one or more recognized objects and/or actionable items included in the captured image(s). For example, a group of graphical elements can be generated to collectively appear as a bounding element (e.g., bounding box, bounding ellipse, bounding shape, etc.) for a recognized object and/or actionable object portion. In the example of FIG. 1(*b*), the group of graphical elements can be generated to adorn or emphasize the recognized, actionable text portion "555-1234". As such, the graphical elements can be generated to collectively appear as a bounding element for the actionable text portion "555-1234". Thus, as shown in FIG. 1(*b*), the graphical elements can substantially surround the text portion "555-1234" displayed on the building.

Although not shown in FIG. 1(*b*), it is also contemplated that the user of the device can interact with the actionable object (e.g., text) portion "555-1234". For example, the user can perform a selected motion or gesture using the user's hand. The motion can be one of a set of motions or gestures recognized by the device to correspond to a particular input or action. If the motion is performed within a viewable area or angular range of at least one of the imaging elements on the device, the device can capture image information including the motion, analyze the image information using at least one image analysis or feature recognition algorithm, and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. One such motion can include a virtual tap or click towards the text "555-1234" which is surrounded by the graphical elements. The user can then be prompted with an option to use the device to dial the phone number "555-1234".

In various embodiments, the one or more graphical elements can be dynamic. In some instances, the graphical elements can change in appearance based on changes in the captured image(s), the position of the object in the cameras field of view, etc. For example, if the user moves the device to the left, then the displayed image can shift to the right on the display. It follows that the device can cause the projection of the graphical elements surrounding "555-1234" on the building to correspondingly shift to the right. Further, in some instances, the graphical elements can change in appearance. In one example, the device can cause each of the graphical elements to change color. For example, the graphical elements can change to a red color as the recognized object or the device is moved such that the object moves outside the center (or some other area) of the field of view of the camera by more than an allowable deviation. The red color can indicate that the recognized object(s) are not optimally positioned within the camera's field of view for object recognition purposes. As the device is moved or the object moves such that the object is optimally positioned within the camera's field of view (e.g., the object is centered or positioned near the center of the camera's field of view), the graphical elements can change to the color green. Other colors are also possible. For example, an orange color can indicate the object is moving away from the center.

In another example, the device can project at least one of the graphical elements such that the graphical elements move around on the surface of the object in a movement pattern distinguishable from that of at least another graphical element. In a further example, the device can cause at least some of the graphical elements to change in color, size, shape, movement path, movement speed, and/or other properties.

In some cases, the dynamic property of the graphical elements can enable the graphical elements to appear as organic (e.g., artificially living) entities, such as fireflies, ladybugs, or bees, that move around on the surface of the object by themselves, while still collectively forming a bounding element for a recognized/actionable object and/or object portion. In some cases, the graphical elements can adorn, decorate, highlight, emphasize, etc., the recognized/actionable object and/or object portion of the object. As such, the user can more easily discern that a particular object (or object portion) is actionable and/or may be of interest to the user.

Although the graphical elements are shown as circular shapes in the example of FIGS. 1(*a*) and 1(*b*), this is for illustratively purposes only. A person of ordinarily skill in the art would recognize that any appropriate shapes or appearances can be utilized to form the graphical elements. For example, as discussed above, each of the graphical elements can be generated to have an appearance resembling that of a firefly or other entity.

Figure 2:
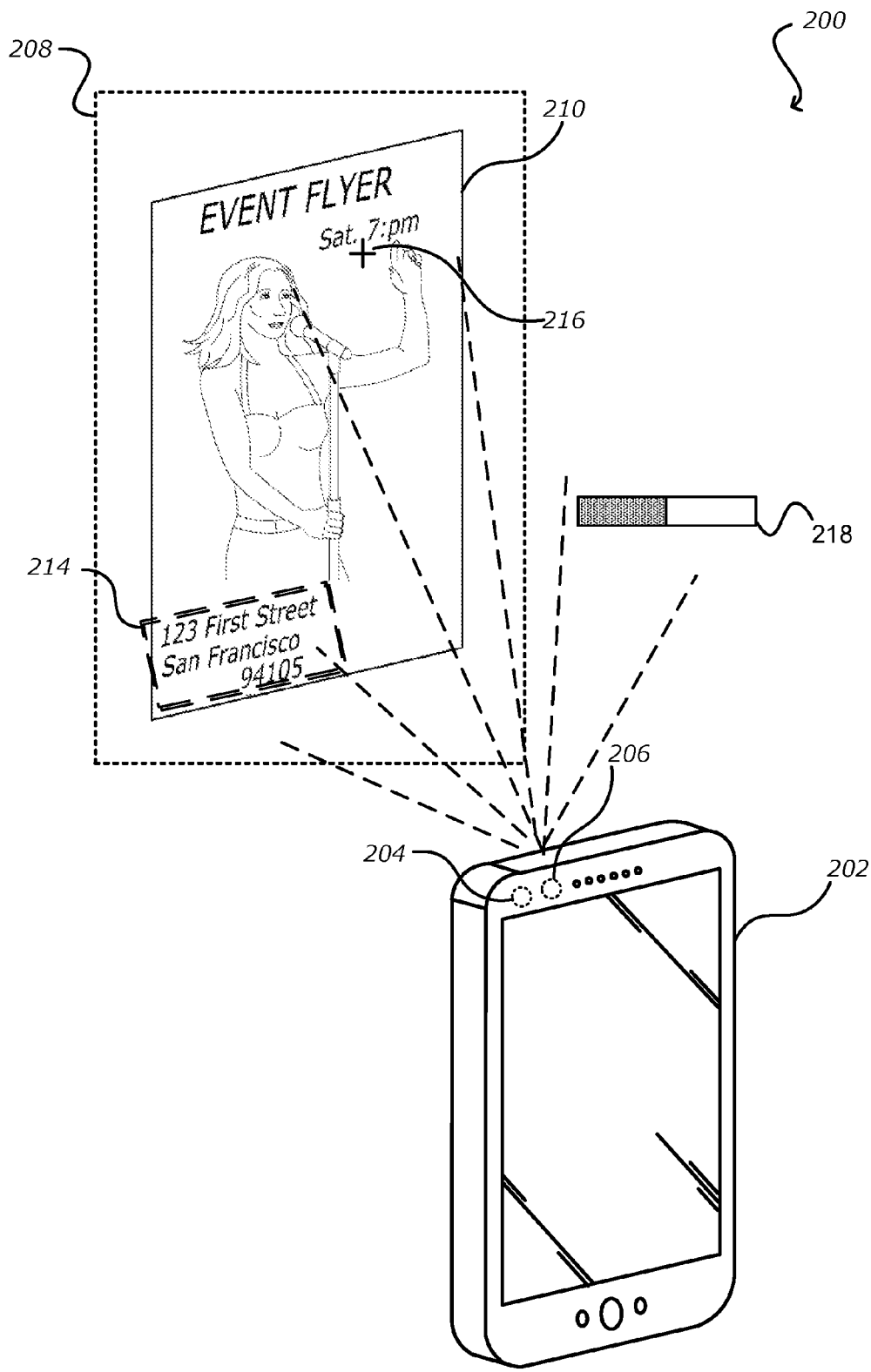

FIG. 2 illustrates an example situation 200 in which one or more graphical features can be utilized as visual feedback to the user. As shown in FIG. 2, the computing device 202 can use at least one camera 204 to capture an image (or video). As described, a projecting element 206 of the device can project one or more graphical elements, such as a bounding shape 208. The bounding shape can include any shape, such as a rectangle, square, circle, quadrangle, where the size of the bounding shape can correspond to the camera's field of view. In some embodiments, the size of the bounding shape can correspond to an optimal area to center the object for object recognition purposes. The projecting element can project the bounding shape on the surface of the object or an area around the object and the user can move the device to center the object in the bounding shape. In this way, the bounding shape can visual indicate to the user the effective area in which the device will perform object recognition.

The captured image can include one or more objects, such as text, included in the bounding shape, and one or more object recognition algorithms of the device can determine one or more objects that are identifiable or recognizable. In this example, the device can be used to capture an image of a flyer 210 that includes text "123 First Street San Francisco 94105" and Sat. 7 pm. The text can be recognized using at least one object recognition process (which can correspond to or at least include an OCR process). Within this recognized text, it can be determined that "123 First Street San Francisco 94105" is an actionable item. This can be because the device can use a mapping application to provide directions or display the address on a map. As such, it can be beneficial to highlight or otherwise emphasize the text portion "123 First Street San Francisco 94105" to a user of the device. For example, the computing device can project one or more graphical elements onto a surface of the event flyer, where the graphical elements collectively appear as a bounding element for a recognized/actionable object or object portion of the object.

In some situations, the object recognition process can be computationally intensively, causing the user to have to wait for at least some amount of time. Further, the object recognition process may require some level of precision in aiming and/or moving the camera to optimally capture an image of the object for object recognition purposes. Accordingly, visual feedback can be projected onto the surface of the object or surrounding area of the object. For example, FIG. 2 illustrates using the projecting element of the device to project visual feedback on the surface of the object or the surrounding area. The visual feedback can include one or more graphical elements to ensure the images are optimally obtained for at least object recognition purposes. The graphical elements can include a bounding shape 214, a cross 216, a status bar 218, among other graphical elements.

The bounding shape can include any shape, such as a rectangle, square, circle, quadrangle, and can be of any color. The size of the bounding shape can correspond to the camera's field of view. In various other embodiments, the size of the bounding shape can correspond to an optimal area to center the object for object recognition purposes. The projecting element can project the bounding shape on the surface of the object or an area around the object and the user can move the device to center the object in the bounding shape. In this way, a user of the camera can see the boundary of images to be captured and the objects within this boundary, and can move the camera so that the objects lie within this region.

In various other embodiments, a cross, hash mark, or other graphical centering feature can be projected on the surface of the object, where the cross can correspond to an optimal area to focus the camera for object recognition purposes. For example, user can move the device so that the object to be recognized is centered around or near the graphical centering feature. In addition to providing user guidance in moving the camera for object recognition purposes, the bounding shape, cross, and/or other similar feature also advantageously assists the camera in adjusting settings, such as by setting auto-focus regions to the projected bounding shape, cross, or other similar feature, which can provide for improved image quality for these regions.

In accordance with an embodiment, the projecting element can also project a progress bar, fireflies, hour glass, or other graphical feature configured to visualize the progression of an extended computer operation, such as an object recognition process, on or near the surface of the object(s). In some situations, the graphical feature can be accompanied by a textual representation of the presses in a perfect formant. In the situation where the extent of the task is unknown or the progress of the task cannot be determined in a way that can be expressed as a percentage, the graphical feature can use motion or some other indicator to illustrate that progress is taking place, rather than using the size of the filled portion of the progress bar (or displayed percentage).

FIGS. 3(a), 3(b), 3(c), and 3(d) illustrate examples in which projected graphical elements can be used to improve object recognition and/or user experience in interacting with detected objects. For example, in example 300 of FIG. 3(a) at least one camera 304 of a computing device 302 can be used to capture an image (or video) of a book 330. The captured image can include one or more objects, such as text, and one or more object recognition algorithms of the device can determine one or more objects that are identifiable or recognizable. In this example, the text can be recognized by the object recognition process (which can correspond to or at least include an OCR process). In accordance with an embodiment, one or more graphical elements can be used to improve the object recognition process. For example, a projection element 306 can project a graphical element 332 corresponding to a region where text can be scanned. In this situation, the graphical element (e.g., a rectangle) can be projected onto the surface of the book. The device can be panned in front of the text, while the projection element projects the rectangle and the device can be caused to scan the text within the rectangle. The object recognition system can recognize the text within the rectangle and can store the text to a clipboard or other data storage component of the device for use by the user. The device can also perform other actions with the text, such as bolding certain words, projecting definitions of certain words, underlining certain words, among other actions.

The device can be used as a text search and highlight tool. For example, the user can speak or type into a search field of the device one or more search terms. The text can be analyzed to locate a position of at least one search term. The device can cause the search term to be highlighted on the surface of the book by projecting one or more graphical elements 334 on the search term, where the graphical elements can substantially bound or surround the recognized text. Accordingly, the device and projection element can be used for in-book text searching.

As described, the projection element can modify, emphasize, and/or other enhance the recognized text. For example, as shown in example, 311 of FIG. 3(b), text can be bolded 313, underlined 315, or otherwise modified such as by adding color or animations proximate to the text using projection from the projection element. For example, upon recognizing the text, the projection element can be caused to project white light on the surface of the object, and on the white light the projection element can project a copy or text mask of the detected text. The projected text mask can be positioned to substantially overlay on one or more corresponding words in the book. In this way, the text can appear bold. The projection element can also project one or more graphical elements to underline words or passages of the text. In accordance with various embodiments, the user can cause the device to perform such modifications in response to a touch input to the device or a gesture detected by the device. For example, the user can perform one or more gesture inputs to indicate which words are to be bolded and/or underlined. Corresponding touch inputs can be performed to cause the projection element to project one or more graphical elements to bold and/or underline the text.

In various embodiments, the projection element can project information related to the recognized text. For example, as shown in example 321 of FIG. 3(c), in response to a request for a definition of the word "coffin", the projection element can project proximate to the word the definition. As shown in example 321, a box 323 including the definition for the requested word is projected on the lower portion of the book. In addition to projecting the definition, the word to which the definition corresponds can be bolded and underlined. In some situations, various links useful in discovering additional information about the requested word can be projected proximate to the word. The user can interact with this links using one or more gestures, where interacting with the links can cause additional information to be projected and or the information to be displayed on a display element of the device.

In some situations, object recognition conditions are not optimal, which can affect the accuracy of the results the object recognition process. For example, the lighting conditions may be less than optimal. This can occur with the book is situated in a dark area. In this situation, the object recognition system may fail to decipher the text in the book due to low contrast. The amount of contrast can be determined by analyzing image statistics, such as color histograms, contrast levels, and/or focus metrics. In various other situations, it may be difficult to recognize the text due to the type of font of the text, the position of the text on the pages, the angle of the text to the camera, etc. In accordance with various embodiments, the projection element of the device can remedy these conditions on the physical surface of the book.

Figure 3A:
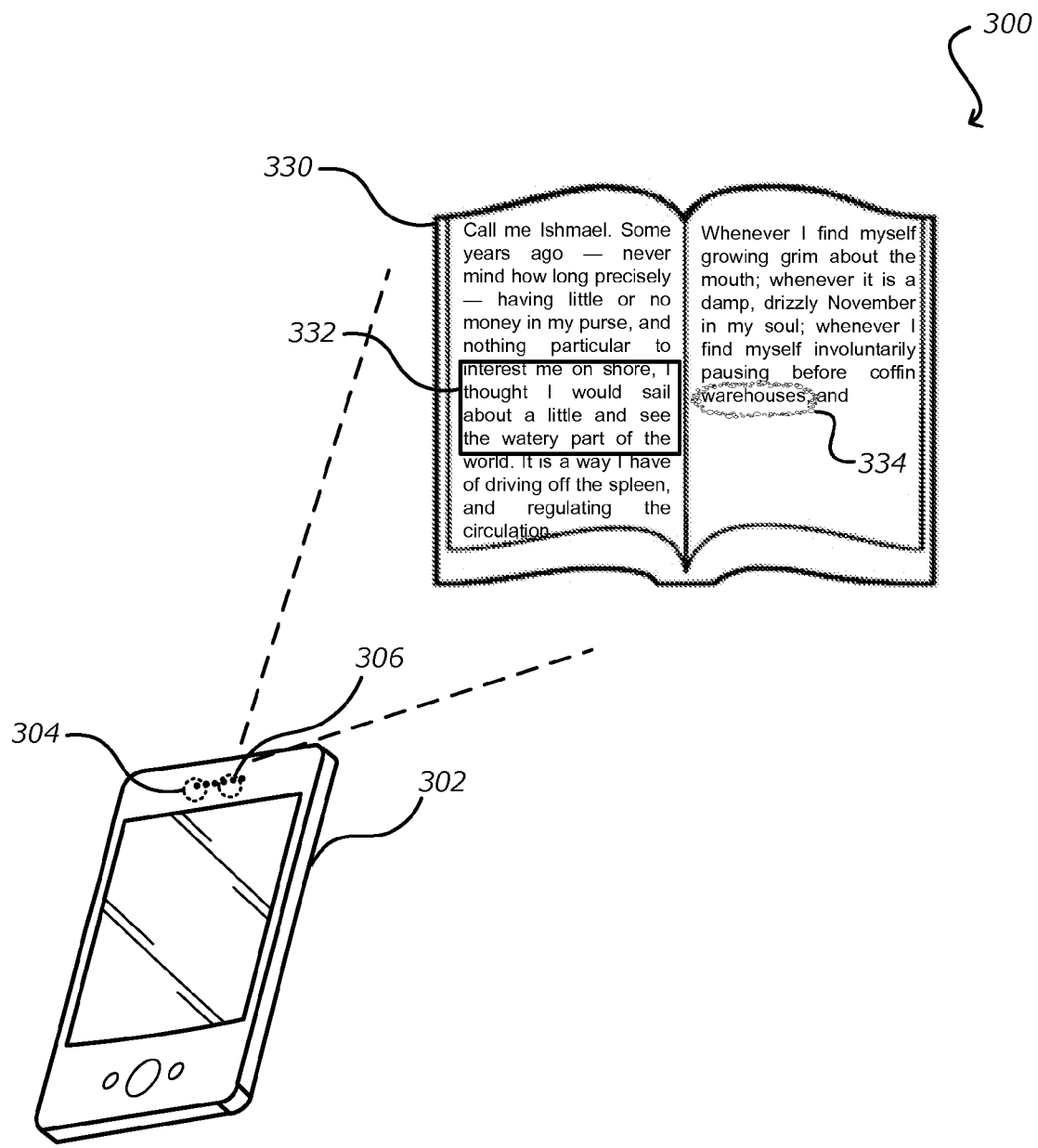
Figure 3B:
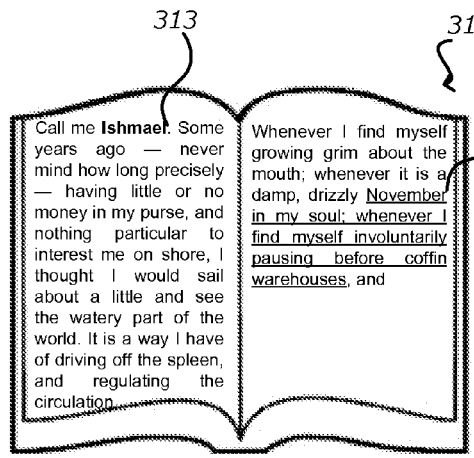
Figure 3C:
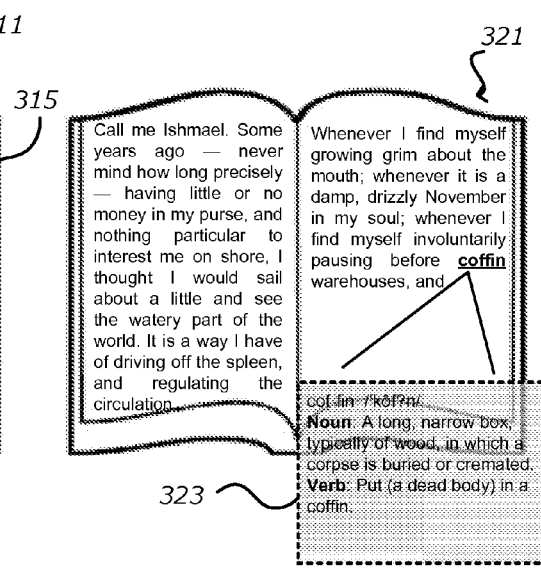
Figure 3D:
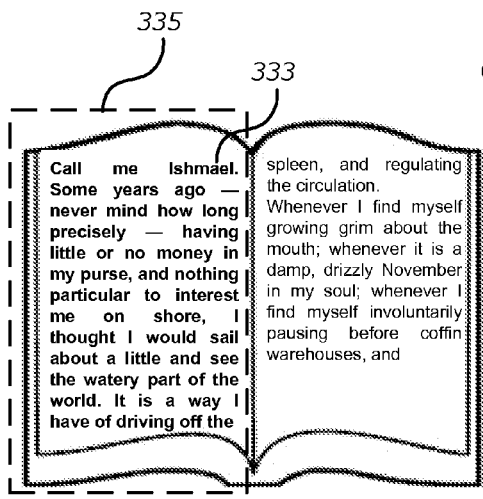
Figure 3E:
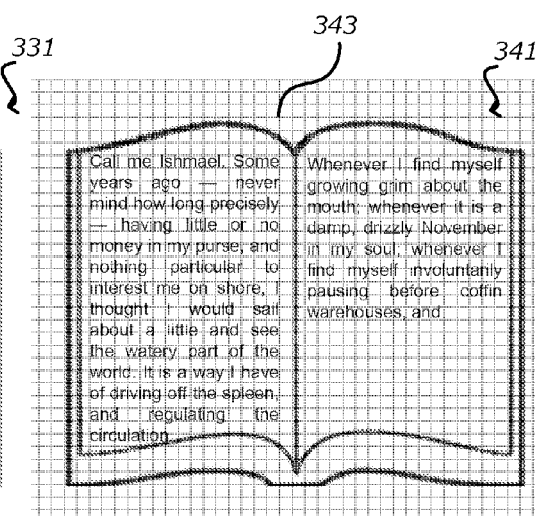

For example, if a region on the surface of the book is determined to be totally or partially dim (e.g., the amount of detected light on the surface of the book is less than a threshold amount), one or more graphical elements can be determined so that the projected image pixels of the graphical element(s) overlapping with the dim region are bright, which can increase the brightness and contrast of the surface of the book to improve an amount of accuracy in text recognition. As shown in example 331 of FIG. 3(d), the brightness and contrast of the text 333 on the left side of the book, as indicated by bounding shape 335, has been increased. In doing so, the projection element can project white light (or other light) onto the surface of the book, which can increase the brightness and contrast of the surface of the book. The device can then analyze the text to recognize the text using at least one text recognition algorithm. Thereafter, the projection element can project text corresponding to text in the book onto the surface of the book. In various embodiments, in addition to, or instead of, projecting a graphical element to increase contrast to improve text recognition, a pattern or other graphical feature can be projected onto the surface of the object to improve text recognition. For example, as shown in example 341 of FIG. 3(e), the pattern can include dots, a grid 343, or any feature that can be used to improve recognition of the text.

Figure 4A:
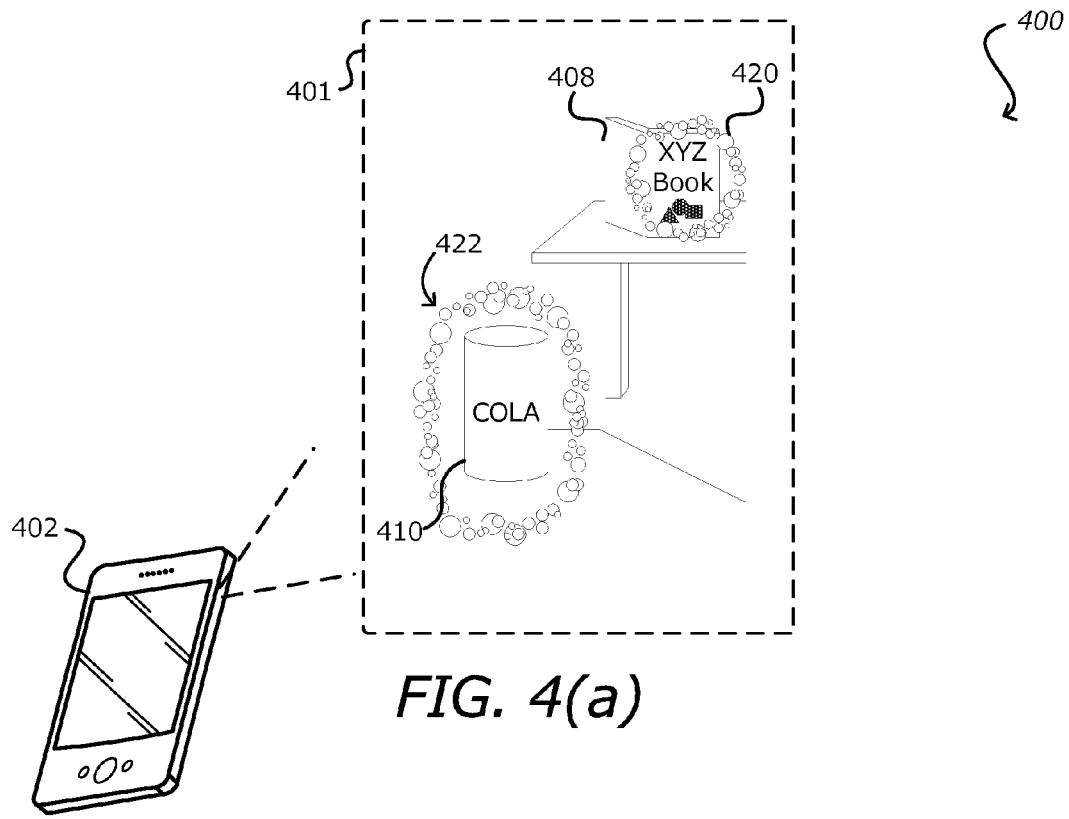

FIG. 4(a) illustrates an example 400 which can utilize one or more graphical elements. In FIG. 4(a), the example computing device 402 can be utilized to recognize multiple actionable objects or object portions. As described, a projecting element of the device can project one or more graphical elements, such as a bounding shape 401. The bounding shape can include any shape, such as a rectangle, square, circle, quadrangle, where the size of the bounding shape can correspond to the camera's field of view. The projecting element can project the bounding shape on the surface of an object or an area around one or more objects and the user can move the device to center the object(s) in the bounding shape. In this way, the bounding shape can visual indicate to the user the effective area in which the device will perform object recognition. As shown in the example of FIG. 4(a), a first object and a second object can be included in the bounding shape. In this example, the first object can correspond to a book 408. The book or at least a portion of the book, such as the front cover, can be determined to be actionable. Accordingly, the computing device can project a first group of graphical elements 420 to at least partially surround the book or the front cover of the book. The second object can correspond to a can of soda 410. The soda or at least a portion thereof, such as the label or logo, can be determined to be actionable. The computing device can project a second group of graphical elements 422 to at least partially surround the soda or at least a portion thereof. The first group of graphical elements and the second group of graphical elements can indicate to a user of the device that two objects or object portions have been recognized, are actionable, and/or may be of interest to the user. Highlighting the objects can also show the user a location of the objects. In this way, the device and projection element can be used to search for and indicate to the user one or more items of interest.

Figures 4B, 4C:
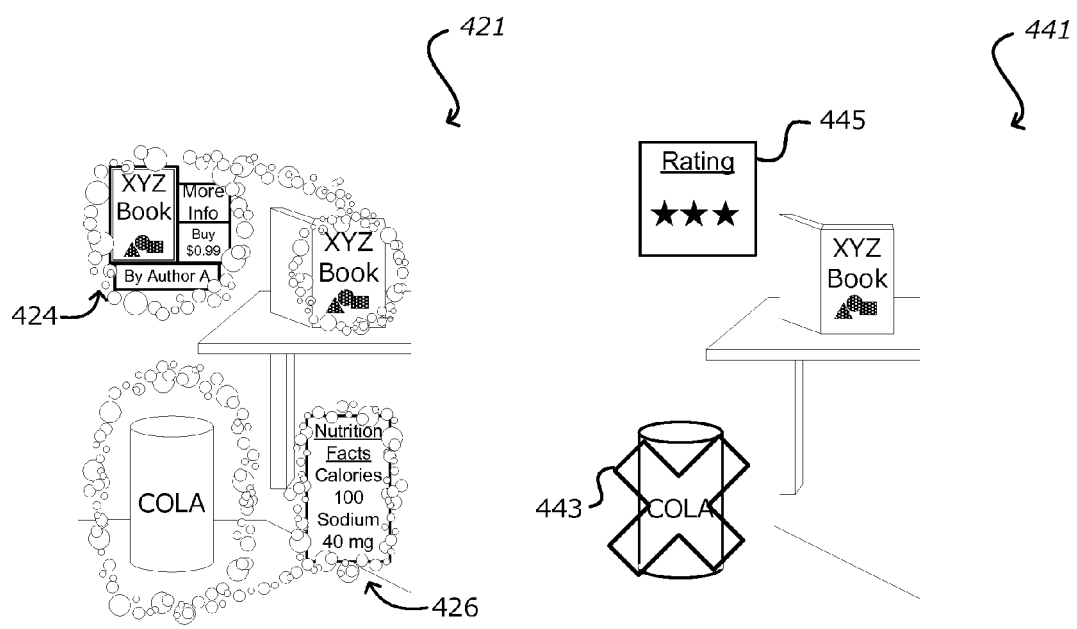

Referring now to FIG. 4(b) and continuing with the previous example, having determined the recognized/actionable objects or object portions associated with the book and the soda, the computing device can perform one or more actions with respect to the recognized/actionable objects or object portions. As shown in the example 421 of FIG. 4(b), information (e.g., "additional information"), such as product information 424, can be provided for the book. The product information can, for example, include details about the book and can also provide an option to purchase (or rent) the book.

Moreover, in the example of FIG. 4(b), nutrition facts 426 can be provided for the soda. In some embodiments, the device can modify the graphical elements in response to the one or more actions being performed.

As shown in example 421 of FIG. 4(b), in some instances, the graphical elements can "grow" or additional graphical elements can be generated, in order to adorn and at least partially surround the information provided (e.g., the product information for the book, the nutrition facts for the soda). Also, graphical elements can be displayed to represent a connection or relationship between each of the recognized/actionable objects or object portions and its respective provided information. For example, information 424 related to the book, such as a price of the book or links to additional information related to the book can be projected proximate to the book. In another example, nutrition facts 426 can be projected proximate to the soda. It should be noted that any type of information and/or graphical elements can be projected proximate to the recognized objects, and the examples shown are not to be taken as limiting. For example, as shown in example 441 of FIG. 4(c), a rating of the book 445 can be projected proximate to the recognized book. Further, using information obtained from social media sites or in other ways, the projection element can project images or names of friends or various other people who have read and/or recommend the book proximate to the book. Other information can also be projected. For example, in the situation a user is using a diet program; the device can recognize a food item and can project an indication onto the food item whether the item is allowed by the user's diet program. For example, if the food item is allowed, a check mark can be projected onto the surface of the food item. If the food item is not allowed by the diet program, a cross 443 can be projected onto the food item. Whether the food is allowed can be determined by the diet program or user supplied rules and/or guidelines, such as nutrition limits, ratios, among other rules. Other information can be projected on or near the surface of the item. For example, the device can recognize the ingredients printed of a nutrition label for a particular food item and the device can project a user-friendly explanation of the ingredients to the user. If the user is monitoring certain nutrition facts (e.g., calories, fat, carbohydrates, protein, etc.), the device can project a running count, percentage of daily allotment, or other such information proximate to a detected food item.

In accordance with various embodiments, the approaches described herein can be used in various other situations. For example, the device can project an x-ray effect, wherein the device can project what is supposed to be inside an object onto the surface of the object. For example, the device can recognize the object, such as a person, and can project the skeletal system, veins, or other anatomy onto the person. Other examples of objects where information that represents the inside of the object can be projected on the surface of the object can include plants, cars, planes, machines, electronic devices, buildings, animals, among others. Accordingly, the device can act as an identification program wherein information associated with an object can be projected proximate to the object.

Figure 5:
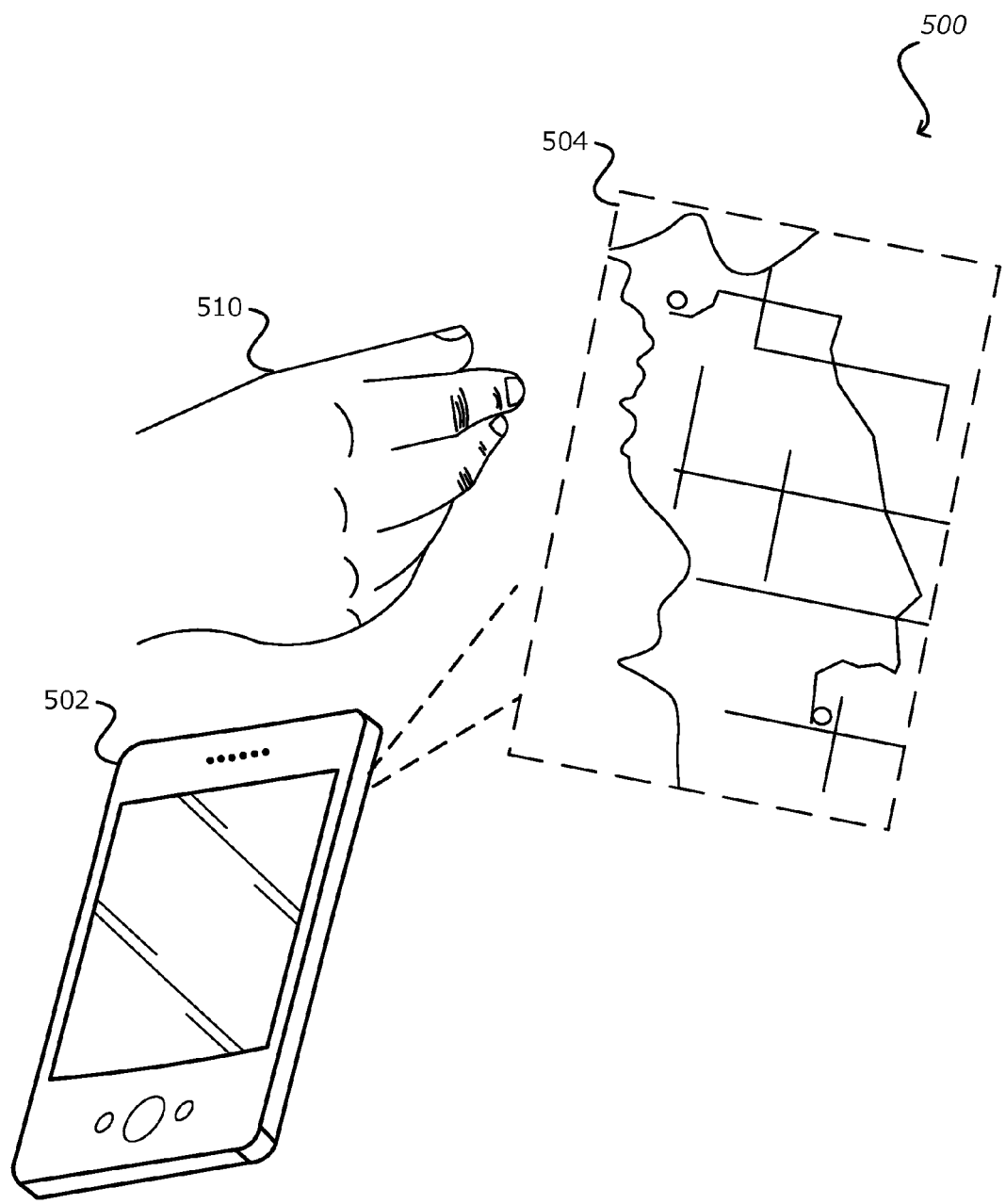
FIG. 5 illustrates an example of projecting graphical features in accordance with various embodiments.

FIG. 5 illustrates an example 500 of interacting with one or more projected graphical features in accordance with an embodiment. In this example, a computing device 502 can project an interactive graphic feature, such as a map 504, onto a surface (e.g., a table, a dash board of a car, the ground, etc.), and a user of the device can interact with the map through touch input received on the device or gesture input performed by a hand 510 (or other object) of the user.

For example, in the situation where touch input is received on the device, such as by touching the display element of the device, pressing buttons on the device, etc., the user can cause the projected graphical image or features of the map to change shape, orientation, and/or size. Similarly, in accordance with various embodiments, the projected image and/or graphical features can be modified based at least in part on one or more detected gestures. As described, the user can perform any number of motion or gesture using the user's hand. The motion can be one of a set of motions or gestures recognized by the device to correspond to a particular input or action. If the motion is performed within a viewable area or angular range of at least one of the imaging elements on the device, the device can capture image information including the motion, analyze the image information using at least one image analysis or feature recognition algorithm, and determine movement of a feature of the user between subsequent frames. In some situations, the camera and the projection element can detect the users hand and modify the projection to project "around" the hand. In this way, the projection is not blocked when the user is performing a gesture. Further, in accordance with various embodiments, the device can determine the shape, texture, orientation, or other characteristic of the object to which the projecting element will project on, and the device can modify the projection to optimally fit and/or overlay onto the object.

In other embodiments, additional information can be projected onto another map. The additional information can include driving directions, popular tourist attractions, and user reviews of various restaurants and/or other establishments. In the situation where the device detects a transit map, the projection element can project recommended routes, transmit times (e.g., bus, train, boat, etc.). In any situation, the user can perform one or more gestures to interact with and/or modify the displayed images. It should be noted that various other graphical features, applications, images, etc. can be projected, and embodiments described herein are not limited to a map. Additionally, such graphical features can be projected on any number of surfaces, such as glass, wood, plastic, etc.

Figure 6:
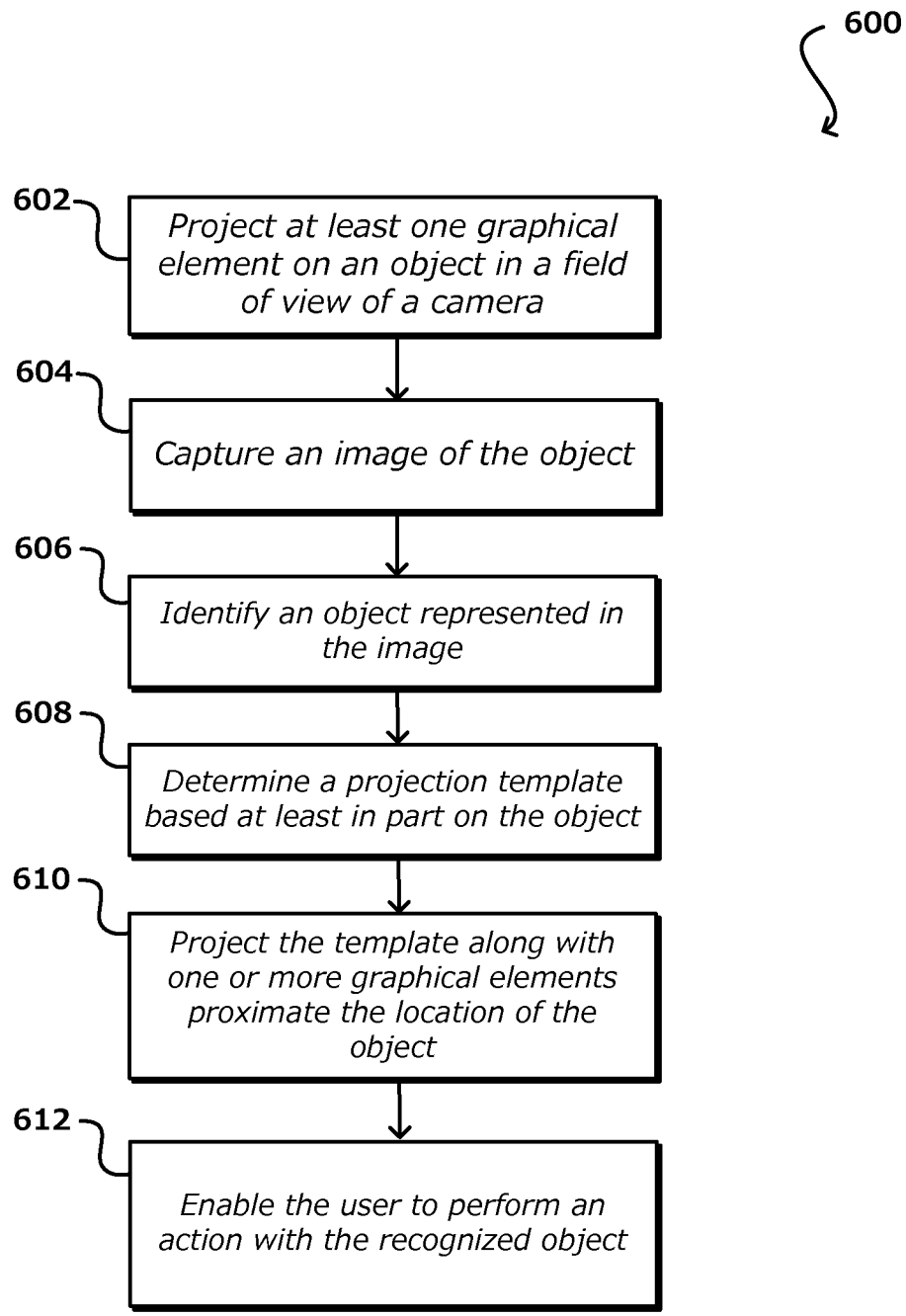
FIG. 6 illustrates an example computing process for projecting graphical features in accordance with various embodiments.

FIG. 6 illustrates an example process 600 for projecting graphical features based at least in part on an object in a field of view of a camera in accordance with various embodiments. It should be understood that, for any process discussed herein, there can be additional, fewer, or alternative steps performed in similar or alternative orders, or in parallel, within the scope of the various embodiments unless otherwise stated. A portable computing device (e.g., a mobile phone, tablet computing, wearable computing, etc.) including a projection element can project 602 at least one graphical element (e.g., light) on an object. In accordance with an embodiment, to determine the amount of light to be projected the device can analyze an amount of light in the field of view of a camera of the device. The projected light can be used to increase the light in the field of view of a camera of the device to at least a threshold amount. In this way, the light (or other projection pattern) can be used to increase the accuracy of one or more algorithms used in an object recognition process. Thereafter, the portable computing device can use at least one camera to capture 604 an image (or video). The captured image can include one or more objects, such as text, and one or more object recognition algorithms of the device can determine one or more objects that are identifiable or recognizable. For example, the image can be analyzed 606 to identify a type of object represented in the image. In some embodiments, the object can be recognized using an object recognition process performed on one or more servers and/or on the computing system. Based at least in part on the type of object identified in the image, a projection template can be determined 608. The projection template can include graphical elements configured to highlight objects; shapes or features configured to guide a user in aiming the camera of the device, among others. Thereafter, a projector element can project 610 one or more graphical elements proximate to the location of the object. The one or more graphical elements can substantially bound or at least partially surround (i.e., bound or surround within an allowable deviation with respect to) one or more recognized objects and/or actionable items included in the captured image(s). For example, a group of graphical elements can be generated to collectively appear as a bounding element (e.g., bounding box, bounding ellipse, bounding shape, etc.) for a recognized object and/or actionable object portion. The user can then perform 612 an action with the recognized object. For example, the captured image can include one or more objects, such as text, and one or more object recognition algorithms of the device can determine one or more objects that are identifiable or recognizable. The user can perform a gesture to interact with the recognized object, and based on the object type, the computing device can run an appropriate application. For example, the object type can be text representing a phone number that the computing device can dial, a URL that the computing device can navigate to using a browsing application, an email address that the computing device can communicate with using a mail application, and so forth.

In some embodiments, the present technology can determine that a recognized object or object portion is associated with a product listed on a user's wish list or otherwise associated with a user's account at an electronic marketplace. In some instances, such as in order to provide more emphasis, the present technology can modify a movement property(ies) associated with the graphical elements adorning the recognized object or object portion. For example, the graphical elements can be made to move faster and/or in accordance with a particular (e.g., distinctive, special) movement pattern.

In some embodiments, the present technology can improve a visibility for an object or object portion. For example, the present technology can enable an accessibility mode of operation, thereby improving an ease of access (e.g., visual access) for users with disabilities. For example, an adorned object or object portion and/or background can be displayed in a different color(s) or brightnesses. Various embodiments of the present technology can also utilize, at least in part, a pseudo-random movement pattern. For example, the pseudo-random movement pattern can cause graphical elements to move, over time, to resemble fireflies flying around. In another example, a pseudo-random algorithm can be used to adjust the other appearance properties (e.g., size, shape, color, brightness, etc.) of graphical elements. It is further contemplated that there can be many other uses and/or applications associated with the various embodiments of the present disclosure that a person having ordinary skill in the art would recognize.

Figure 7:
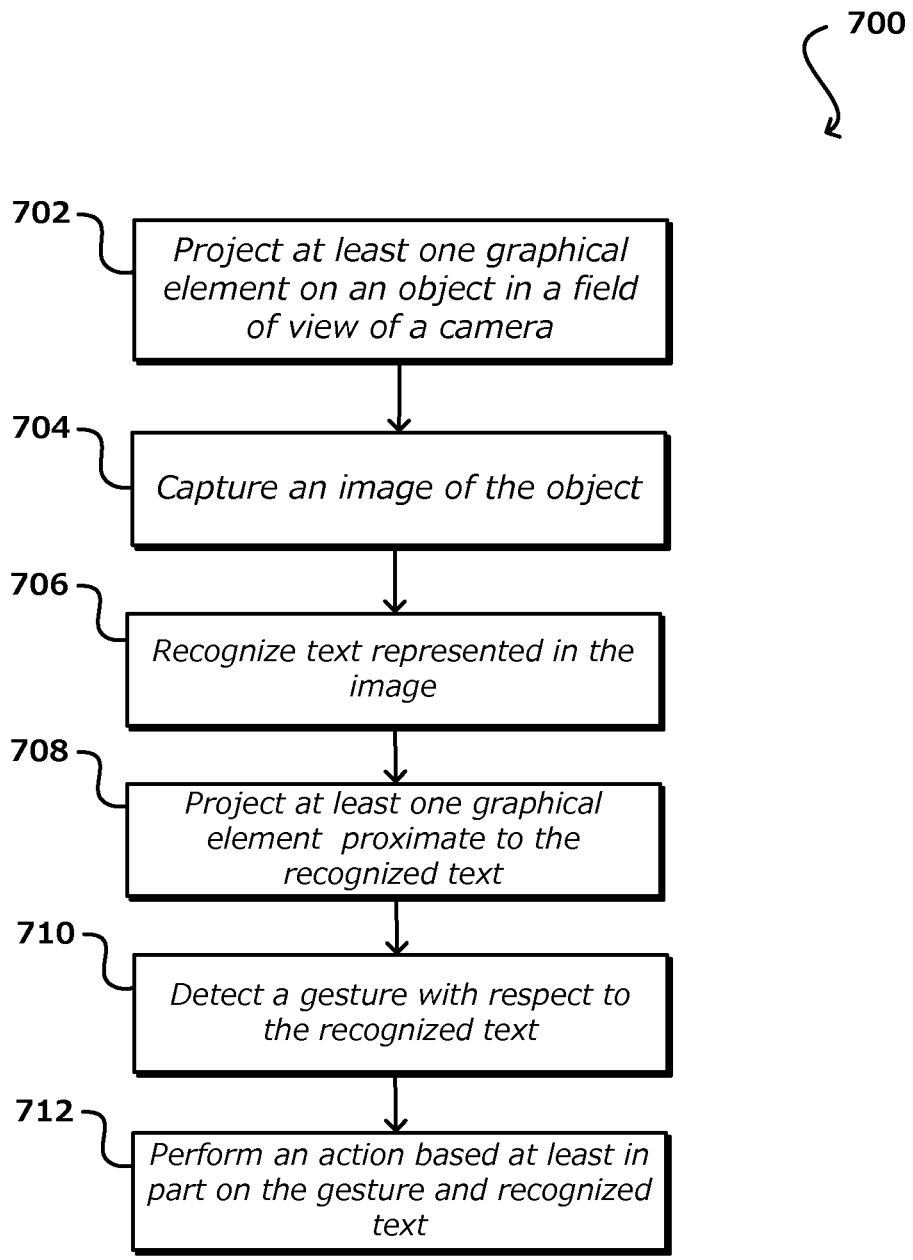
FIG. 7 illustrates an example process for projecting graphical features in accordance with an alternate embodiment.

FIG. 7 illustrates an example process 700 for projecting graphical features based at least in part on an object in a field of view of a camera in accordance with various embodiments. In this example, due to various conditions such as an amount of lighting, a portable computing device (e.g., a mobile phone, tablet computing, wearable computing, etc.) including a projection element can project 702 at least one graphical element (e.g., light) on an object, such as a book, a magazine, or any object that includes text to improve object recognition accuracy. That is, in some situations, the lighting conditions may be less than optimal, which can decrease the likelihood of recognizing text on the object. As described, the amount of light and/or contrast can be determined by analyzing image statistics, such as color histograms, contrast levels, and/or focus metrics. In accordance with various embodiments, the projection element of the device can remedy these conditions on the physical surface of the book by projecting light onto the surface of the object before the device attempts to recognize any text on the object. For example, if a region on the surface of the book is determined to be totally or partially dim (e.g., the amount of detected light on the surface of the book is less than a threshold amount), one or more graphical elements can be determined so that the projected image pixels of the graphical element(s) overlapping with the dim region are bright, which can increase the brightness and contrast of the surface of the book to improve an amount of accuracy in text recognition.

Thereafter, the portable computing device can use at least one camera to capture 704 an image (or video) of the object and text. The text can be recognized 706 by the object recognition process (which can correspond to or at least include an OCR process), and the projection element of the device can project 708 one or more graphical elements that can substantially bound or at least partially surround (i.e., bound or surround within an allowable deviation with respect to) the recognized text and/or actionable text included in the captured image. The one or more graphical elements can be actionable. For example, the user can perform a gesture to interact with the recognized text. The gesture can be detected 710 with respect to the recognized text, and based at least in part on the gesture and the recognized text, the computing device can perform an action 712, such as running an appropriate application. For example, the text can represent a phone number that the computing device can dial, a URL that the computing device can navigate to using a browsing application, an email address that the computing device can communicate with using a mail application, and so forth.

Figure 8:
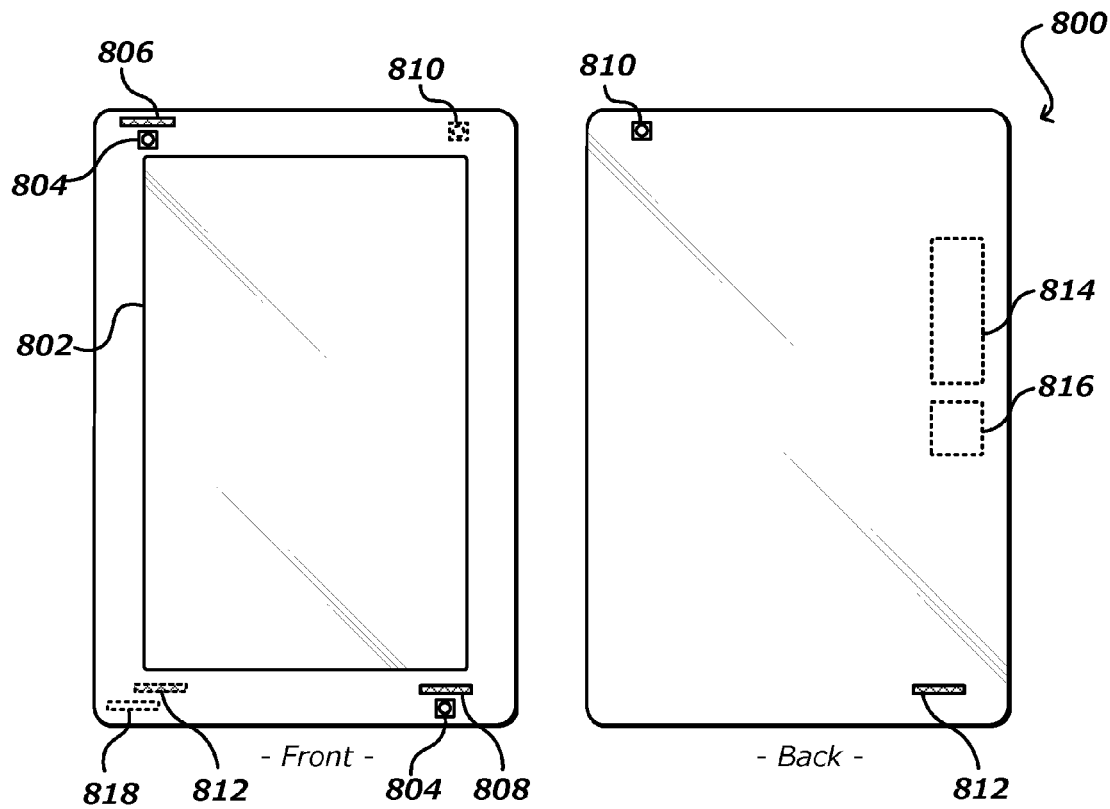
FIG. 8 illustrates an example device that can be used to implement aspects of the various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
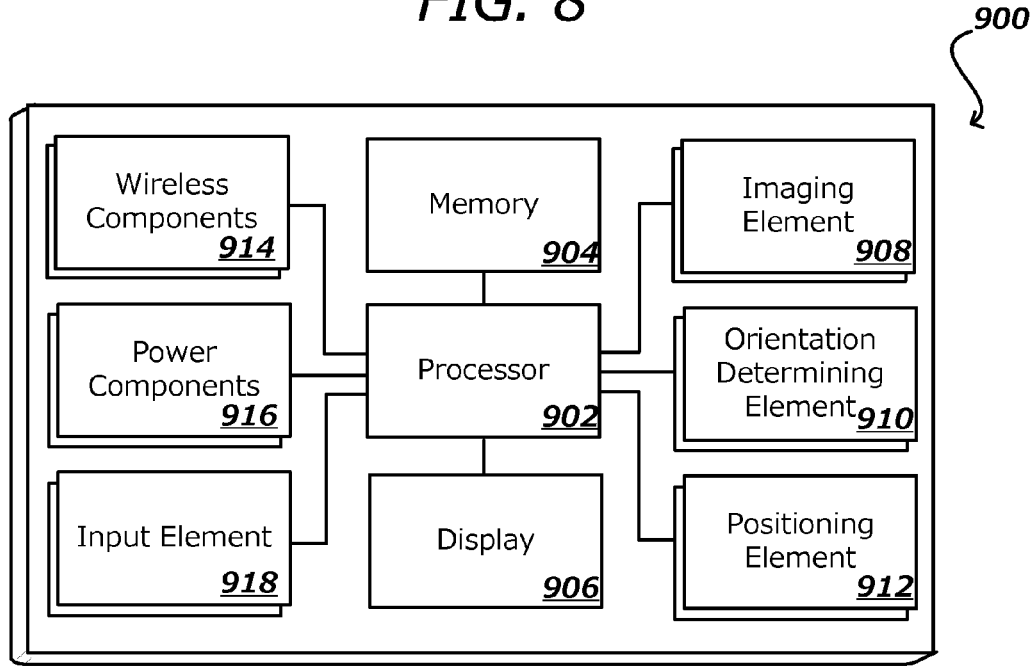
FIG. 9 illustrates example components of a client device such as that illustrated in FIG. 8.

FIG. 9 illustrates a set of basic components of an electronic computing device 800 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
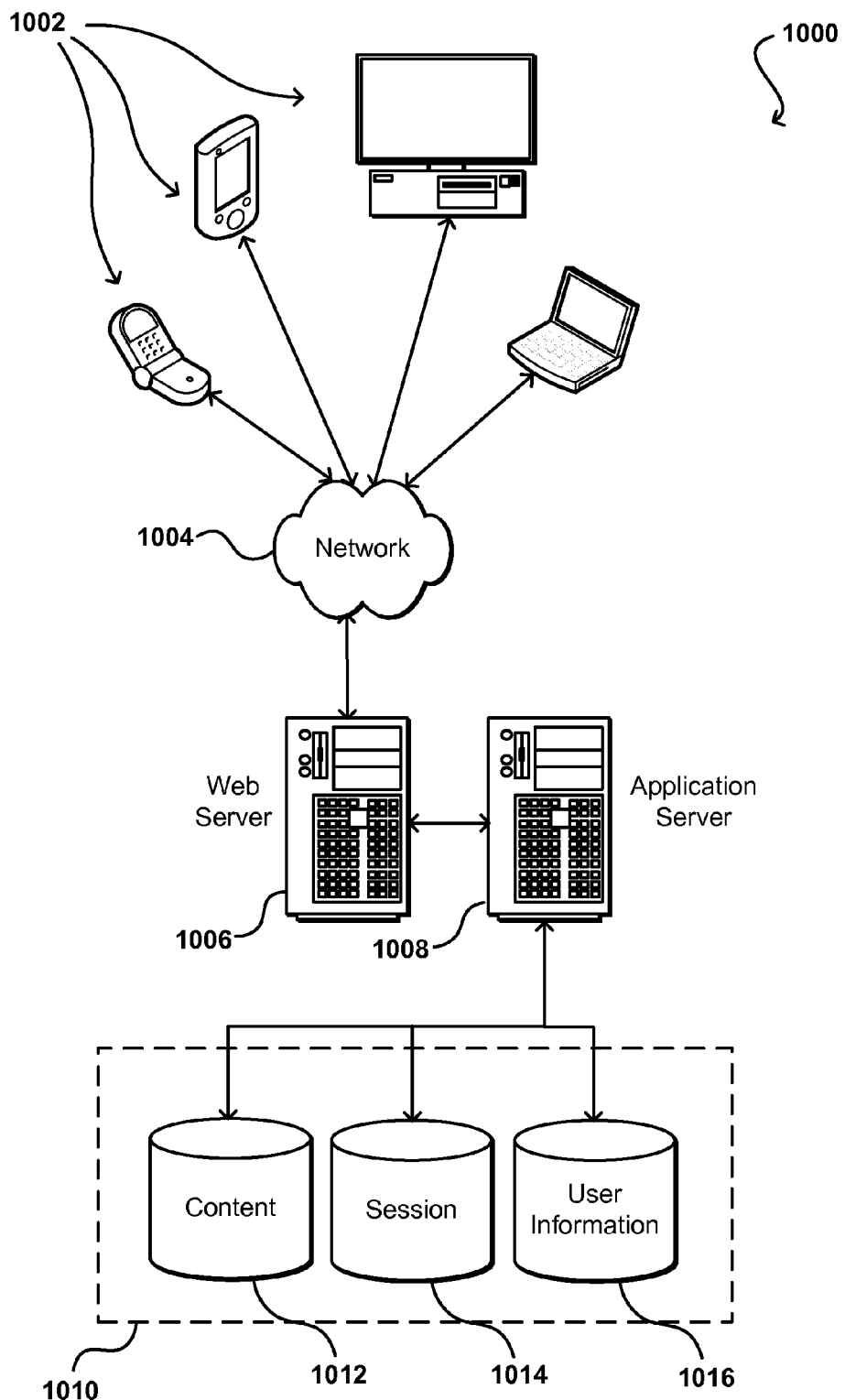
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Pert, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
at least one processor;
a projector element;
a camera; and
a memory including instructions that, when executed by the at least one processor, enables the computing device to:
project a first graphical element, using the projector element, on an object;
acquire an image using the camera, the image including a representation of the object;
analyze the image to identify an object type for the object and a projection template for the object type; and
project a second graphical element on the object using the projector element according to the projection template for the object, the second graphical element indicating at least one action capable of being performed with respect to the object.

2. The computing device of claim 1, wherein the object comprises text, the first graphical element illuminates at least a portion of the text with light that is substantially white, and wherein the second graphical element comprises underlining at least a portion of the text.

3. The computing device of claim 1, wherein the object comprises text and wherein the instructions, when executed, further cause the computing device to:
receive a search query;
identify a first portion of the text corresponding to the search query; and
project a third graphical element on the first portion of the text.

4. The computing device of claim 1, wherein the object type is one of text, an object, a person, or a map.

5. A computer implemented method, comprising:
acquiring an image of an object using a camera of a computing device;
analyzing the image to identify an object type for the object and a projection template for the object type;
determining a graphical element to be projected proximate to the object according to the projection template for the object; and
projecting the graphical element proximate to the object.

6. The computer implemented method of claim 5, further comprising:
receiving a search query;
wherein analyzing the image to identify the object is based at least in part on the search query; and
wherein the graphical element at least partially highlights the object.

7. The computer implemented method of claim 5, further comprising:
projecting a first graphical element proximate to the object before acquiring the image of the object.

8. The computer implemented method of claim 6, wherein the graphical element comprises information about the object.

9. The computer implemented method of claim 5, wherein the graphical element includes a status bar indicating a level of progress for computing an operation by the computing device.

10. The computer implemented method of claim 5, wherein the graphical element comprises a bounding shape configured to surround the object, and wherein the bounding shape is configured to visually guide a user to adjust a direction of a field of view of the camera.

11. The computer implemented method of claim 10, wherein the bounding shape uses a first color to indicate that the object is not substantially centered in the field of view of the camera and uses a second color to indicate that the object is substantially centered in the field of view of the camera.

12. The computer implemented method of claim 5, wherein the graphical element includes a cross, the cross indicating a center of a field of view of the camera.

13. The computer implemented method of claim 5, wherein the object comprises text and the method further comprises:
analyzing the image to identify the text using at least one character recognition algorithm;
determining a text mask corresponding to the text; and
projecting the text mask on at least a portion of a surface of the text.

14. The computer implemented method of claim 5, further comprising:
detecting an interaction with the graphical element; and
modifying the graphical element based at least in part on the interaction.

15. The computer implemented method of claim 8, wherein the information includes at least one of a name of the object, a description of characteristics associated with the object, pricing information associated with the object, or a reference to one or more resources associated with the object.

16. A non-transitory computer readable storage medium storing one or more sequences of instructions executable by one or more processors to perform a set of operations comprising:
acquiring an image of an object using a camera of a computing device;
analyzing the image to identify an object type for the object and a projection template for the object type;
determining a graphical element to be projected proximate to the object according to the projection template for the object; and
projecting the graphical element proximate to the object.

17. The non-transitory computer readable storage medium of claim 16, further comprising instructions executed by the one or more processors to perform the set of operations of:
receiving a search query;
wherein analyzing the image to identify the object is based at least in part on the search query; and
wherein the graphical element at least partially highlights the object.

18. The non-transitory computer readable storage medium of claim 17, further comprising instructions executed by the one or more processors to perform the set of operations of:
  projecting a first graphical element proximate to the object before acquiring the image of the object.

19. The non-transitory computer readable storage medium of claim 16, wherein the graphical element includes at least one of a status bar indicating a level of progress for computing an operation by the computing device, a bounding shape configured to surround the object, and wherein the bounding shape is configured to visually guide a user to adjust a direction of a field of view of the camera, or a cross, the cross indicating a center of a field of view of the camera.

20. The non-transitory computer readable storage medium of claim 16, further comprising instructions executed by the one or more processors to perform the set of operations of:
  detecting an interaction with the graphical element; and
  modifying the graphical element based at least in part on the interaction.

* * * * *